United States Patent

Baker

[15] 3,650,608
[45] Mar. 21, 1972

[54] METHOD AND APPARATUS FOR DISPLAYING COHERENT LIGHT IMAGES

[72] Inventor: Charles E. Baker, Dallas, Tex.
[73] Assignee: Texas Instruments Incorporated, Dallas, Tex.
[22] Filed: Dec. 23, 1969
[21] Appl. No.: 887,511

[52] U.S. Cl. .................................350/320, 40/52, 352/40, 353/69, 353/121, 350/117, 350/160
[51] Int. Cl. .........................................G03b 21/60
[58] Field of Search ..............350/160, 117, 123, 320; 40/52, 40/106.52; 352/40, 43, 201, 244; 353/28, 46, 69, 121

[56] References Cited

UNITED STATES PATENTS

| | | | |
|---|---|---|---|
| 3,322,485 | 5/1967 | Williams | 350/160 |
| 3,425,771 | 2/1969 | McCown | 350/160 |
| 3,499,702 | 3/1960 | Goldmacher et al. | 350/160 |
| 3,524,145 | 8/1970 | Fowler | 330/94.5 |
| 3,551,026 | 12/1970 | Heilmeier | 350/160 |
| 3,576,364 | 4/1971 | Zanoni | 350/160 |

OTHER PUBLICATIONS

"Liquid Crystals...," The Glass Industry 8/68 pp. 423–425.
Dakss et al. "Acousto–Electro–Optical Scanlaser," I.B.M. Tech. Discl. Bul., Vol. 11, No. 5 10/68 pp. 532–534.
Fowler et al., "A Survey of Laser Beam Deflection Techniques," Applied Optics, Vol. 5, No. 10 pp. 1675–1681, 10/66
B. M. Elson, "Experimental Display Devices Use Films of Liquid Crystals," Aviation Week & Space Tech. July 8, 1968, pp. 71–72.

*Primary Examiner*—Ronald L. Wibert
*Assistant Examiner*—Jeff Rothenberg
*Attorney*—Samuel M. Mims, Jr., James O. Dixon, Andrew M. Hassell, Harold Levine, Rene E. Grossman, Mel Sharp and John Vandigriff

[57] ABSTRACT

A method and apparatus for destroying the scintillation or speckling effect observed when a bema of coherent light is impinged or directed upon a stationary screen includes a relatively thin layer of an organic nematic mesomorphic compound which is impressed with a voltage above the particular threshold electric field which causes the compound to scatter light.

8 Claims, 2 Drawing Figures

Patented March 21, 1972
3,650,608
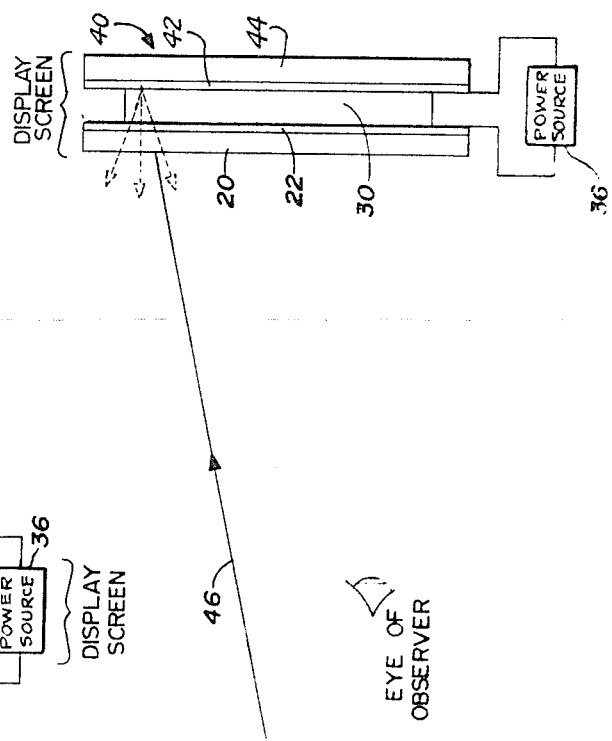
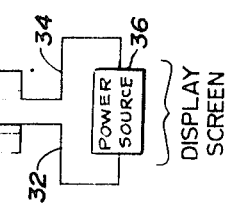
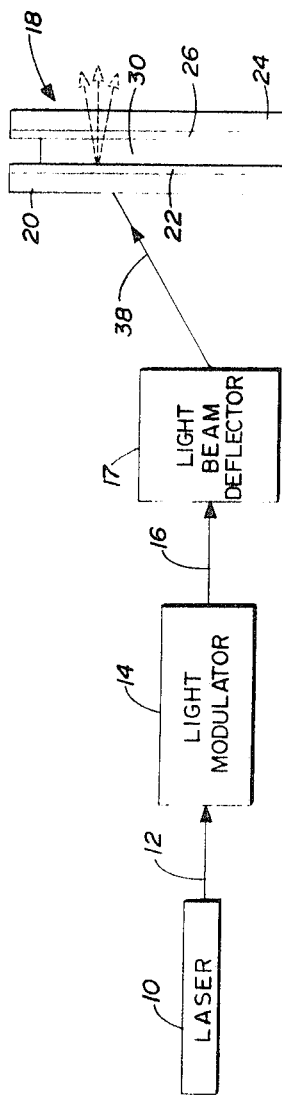
INVENTOR
CHARLES E. BAKER
René E. Grossman
ATTORNEY 3,650,608

1

METHOD AND APPARATUS FOR DISPLAYING COHERENT LIGHT IMAGES

This invention relates to optical displays and, more particularly, to an electro-optical display apparatus and method for use with a coherent light beam.

When a visible coherent light beam, for example, from a laser, illuminates a fixed diffuse reflecting surface such as a matte white screen, the illuminated area has a sparkling appearance. The same observation can be made when such a coherent light beam is directed onto a stationary diffuse optical transmission surface such as a rear projection display screen. Near the display surface, when the eye is fixed, the illuminated area appears to be peppered with bright and dark dots like a beaded screen or a very grainy photograph. As the viewing distance increases, the dots grow in size and the surface takes on a mottled or speckled appearance. At still greater distances, single bright or dark patches cover the entire illuminated area causing it to flicker or twinkle as the head is moved from side to side. Stopping down the pupil of the eye causes the spots to grow and the twinkling to occur at a closer range. Lateral motion of the head causes the spots to move with respect to the screen. Near the illuminated area, the spots move with the head as if they were behind the screen. At greater distances, some observers see them move with the head while others see them move in the opposite direction as if they were in front of the screen. These phenomena are commonly known as the scintillation effect or speckling effect caused by the incidence of coherent light on a diffuse surface. This phenomenon has been attributed to the fact that coherent light reflected by or through a diffusing surface produces a complex, random, but stationary diffraction pattern.

Several methods for destroying this scintillation or speckling effect have been disclosed in the art. A coherent light source has been rotated in a continuous manner about the optical axis of the system to partially destroy the coherence between the source and the object. Diffuse screens, as the ones used in relation to the explanation above, have been utilized to destroy the scintillation effect by setting them in a constant vibratory motion, thus, breaking up the stationary diffraction pattern caused by the coherent light. Another method used for eliminating the speckling has been to pass the laser beam through a weak milk-water solution. In the latter method, the suspended milk particles undergoing Brownian motion provide a time varying diffusing screen which yields results comparable to those obtained with incoherent illumination. A time averaging technique on a spherical wave front has been accomplished by arranging for the incident wave of coherent light to be passed through a rotating flat glass plate, tilted slightly out of the plane perpendicular to the optical axis, prior to striking a projection surface. All of the foregoing techniques for destroying the scintillation effect have drawbacks either in the fact that they are only experimentally practical or that they add greatly to the cost and complexity of the optical display equipment utilizing coherent light sources.

It is therefore desirable to eliminate this stationary, random, complex diffraction pattern which results when a coherent light source is directed toward a diffuse display screen. It is desirable to possess a display screen or apparatus which will in itself destroy or eliminate the speckling observed when coherent light from a source such as, for example, a laser is directed upon a screen to display information. Development of a mechanically simple and relatively inexpensive screen for a television type, rear projection laser display is of increasing importance since such types of displays are becoming of increasing importance, especially for use as a large screen dynamic display.

This invention therefore provides a novel apparatus comprising a source of a coherent light beam, a screen means for scattering a coherent light beam, means for directing the light beam toward the screen means, the screen means including an optically transmissive layer of an organic nematic mesomorphic compound less than 20 mils thick and means for continuously impressing a voltage gradient across a functional portion of the layer having a value greater than the threshold value which causes the compound to scatter light. The procedure for carrying out the present invention includes displaying a coherent light beam on a screen comprising directing a coherent light beam toward an optically transmissive, relatively thin layer of an organic nematic mesomorphic compound having a threshold electrical field which when exceeded causes the compound to scatter light, and impressing a voltage gradient across the layer of the organic nematic mesomorphic compound.

For a better understanding of preferred embodiments of the present invention, refer to the attached drawings wherein:

FIG. 1 is a schematic illustration of a coherent light beam directed toward a display apparatus of the present invention;

FIG. 2 is a schematic illustration of another embodiment of the present invention utilizing a display apparatus of the present invention.

Referring now to FIG. 1, a coherent light source 10, illustrated schematically as a laser, directs a coherent light beam 12 through light modulator 14 in which the intensity or brightness of the light beam is varied in accordance with a predetermined input signal. From the light modulator 14 the intensity modulated laser beam 16 is directed into a scanning mechanism or light beam deflector which causes the light beam to be deflected or scanned in a predetermined pattern. This pattern is projected or displayed upon a screen, generally designated 18. Suitable laser light modulating mechanisms and light beam deflector apparatus are disclosed in "Laser Display Technology" by C. E. Baker, *IEEE Spectrum*, Vol. 5, No. 12, Dec., 1968, pages 39–50, incorporated herein by reference. The rear projection display screen 18 includes a first transparent substrate 20, for example a planar sheet of glass. The substrate is coated on one side with a layer or coating 22 of material which is optically transmissive and electrically conductive. The display screen also includes a second substrate 24 similar to substrate 20 which is also coated with a layer or coating 26 of material which is electrically conductive, and in this embodiment also optically transmissive. Sandwiched between the two layers 22 and 26 and in electrical contact therewith, is a relatively thin layer 30 of an organic nematic mesomorphic compound. The layer has an optimum thickness of less than 20 mils, preferably less than 10 mils, and most preferably has a thickness in the range of 1 to 4 mils. Leads 32 and 34 are connected respectively to the electrically conductive layers 22 and 26. The leads are also connected to a power source 36 which impresses a sufficient voltage when energized to cause the organic nematic mesomorphic compound to diffuse light which strikes it, as will be explained hereinafter. The power source is preferably a direct current source, although alternating current is usable.

To the eye of the observer then, the beam of coherent light 38 striking the rear side of the projection screen 18 appears to be a bright stationary display point, not exhibiting the heretofore troublesome phenomenon of speckling or scintillation. The image created on the screen, of course, can be of a variety of configurations, depending upon the particular manner in which the coherent light beam is modulated and/or deflected. An exemplary image can be produced by a raster scan of the screen, displaying, for example, a dynamic image such as a conventional line television image. As previously mentioned, this type of display would be of great importance in a large screen dynamic display such as that utilized in closed circuit television, conferences, and public information displays. Heretofore, this type of display has been subject to the scattering or scintillation effect which increases with the distance of the observer from the display screen. In addition the screen of the present invention can be utilized to improve other coherent and light image applications, such as transparency projection and holography.

In FIG. 2, a second embodiment of the present invention is schematically illustrated wherein a front projection screen, generally designated 40, is shown rather than a rear projection screen as is illustrated in the previous figure. Similar reference numerals are utilized where applicable. Again, a coherent light beam 12 from, for example, a laser 10 is modulated and deflected according to a predetermined pattern. In this embodiment, the display screen 40 is similar to that previously described except that the layer or coating 42 on substrate 44 is optically reflective rather than optically transmissive. In this embodiment, the modulated and deflected coherent light beam 46 is directed towards the display screen 40, is transmitted through substrate 20, layer 22 and the layer 30 of the organic nematic mesomorphic compound where it strikes the reflective coating 42 and is reflected back toward the eye of the observer. In the same manner as in the previous embodiment, the coherent light beam is dynamically diffused or scattered resulting in a stationary, nonspeckled or nonscintillating image.

The display screen, as disclosed herein, generally must include two substrates with coatings of uniform thickness which are spaced substantially equidistant along the entire surface which will be scanned or used for display. Among other things, this aids in control of the thickness of the organic nematic mesomorphic compound layer and also assists in maintaining substantially an equal voltage drop across the entire layer. The voltage preferably is continuously impressed across the organic nematic mesomorphic layer to effect a continuous stationary image as seen by an observer. The substrates comprising the display screens 18 or 40, as the case may be, are positioned less than 20 mils, preferably less than 10 mils, and most preferably less than 4 mils apart by means of spacers (not shown) or other suitable spacing means, such as a frame.

The substrates 20 and 24 can be composed of any of a variety of optically transmissive solids, for example, the various types of glass, fused quartz, transparent varieties of corundum and transparent plastics or resins. The term optically transmissive as used herein includes both transparent and translucent materials. The transmissive coating on the substrates is also transparent in the case of coatings 22 and 26. Such a coating can be composed of layers of indium oxide or tin oxide across the entire surface of the substrate 20 which is contacting the organic nematic mesomorphic compound. If a reflective surface is desired, such as coating 42, a thin layer of a metallic coating such as silver or aluminum, can be deposited on the substrate 44. When a reflective coating is used, it is obviously unnecessary to employ a transmissive substrate.

As for the organic nematic mesomorphic compound usable within the scope of the present invention, the three common states of matter or states of aggregation are the solid, liquid, and the gas, in which the randomness of geometrical arrangement of the molecule increases from the solid to the liquid to the gas. The gas and the ordinary liquid are both isotropic, having the same physical properties in all directions. The solid may be amorphous, in which case the geometrical arrangement of the molecules is random, but the molecules are sufficiently bound so they are unable to move with respect to each other. Most inorganic and organic solids are found to be crystalline, that is, their molecular units are arranged in a regular repeating geometric pattern known as a lattice unit. Many crystalline solids are anisotropic, since their physical properties vary depending on the direction of measurement with respect to the different crystal axes. For most pure substances, the transition temperature between the solid state and the liquid state is quite sharp, so that it has become customary to regard the sharpness of the melting point of a solid material as an indication of the purity of the material.

Certain organic solid compounds such as esters of cholesterols exhibit a peculiar behavior when heated. These substances melt sharply at one temperature, but produce a turbid melt. On further heating to a higher temperature, the turbid melt abruptly changes to a clear isotropic liquid. In the temperature range between the solid and the isotropic liquid, these materials are anisotropic with respect to light when viewed between crossed polaroids. The characteristics of these materials are thus partly those of the crystalline solid, since they are anisotropic, and partly those of the isotropic liquid, since they exhibit liquid flow. The materials are therefore often called "liquid crystals," or, more accurately, "crystalline liquids." At present, it is customary to regard these materials as forming a fourth state of matter known as the mesomorphic state or mesophase, since it is a state or phase intermediate between that of the anisotropic crystal and that of the isotropic liquid.

There are several mesomorphic states or forms, such as the semectic mesophase and the cholesterolic mesophase. One of these is the nematic mesophase. The term "nematic" means "thread-like," since materials in this state frequently assume a characteristic thread-like texture when a thin section of the material is viewed between crossed polaroids. When a nematogenic crystalline solid is heated in a capillary tube, the crystals collapse sharply at the melting point, but in this case form a flowing turbid liquid which uniformly fills the capillary to a particular height, and exhibits a definite meniscus. At a higher temperature, the turbidity of this nematic mesophase suddenly disappears, and the liquid becomes an ordinary isotropic liquid. An example of a compound which exhibits a nematic mesophase is 4'-methoxybiphenyl-4 carboxylic acid. Some organic compounds, for example, 5 chloro-6-n-heptyloxy-2 naphthoic acid, may exist in either the anisotropic crystalline solid phase, or the anisotropic semectic (a different) mesophase, or the anisotropic nematic mesophase, or the isotropic ordinary liquid phase, depending on the temperature. It is believed that in the nematic mesophase the molecules of the melt are ordered so that the molecules are parallel, but the ends of the molecules are not in any definite or regular arrangement.

Mesomorphic states are generally thermotropic, that is, they are exhibited only within a certain temperature range above the melting point of the solid, and hence are restricted to melts. It has been found that when certain solid compounds are dissolved in a suitable solvent, the resulting solution is not a true solution, since it is not isotropic with respect to the transmission of light. The alkali metal salts of long chain aliphatic acids tend to exhibit such behavior. When an excess of the solvent is added, these anisotropic solutions become true isotropic solutions. Certain inorganic materials such as vanadium pentoxide also exhibit this type of behavior when dissolved in a suitable solvent. These characteristics of inorganic materials are thought to be connected with the colloidal state. Since the anisotropy of these materials depends on their being suitably dissolved, and exists at temperatures below the melting point of the solid, this type of mesomorphism is known as lyotropic (as opposed to thermotropic) mesomorphism.

For a more complete discussion of the mesomorphic states or mesophases, see, for example, G. W. Gray, *Molecular Structure and the Properties of Liquid Crystals*, Academic Press, New York, 1962.

Mesomorphic materials suitable for the practice of this invention are organic thermotropic nematic compounds. Examples of such compounds are:
deca-2,4-dienoic acid
4,4' di-n-heptoxyazoxybenzene
4,4' di-n-hexoxyazoxybenzene
4,4' di-n-pentoxyazoxybenzene
4,4' di-n-butoxyazoxybenzene
4,4'-diethoxyazoxybenzene
undeca-2,4-dienoic acid
nona-2,4-dienoic acid
4,4'-dimethoxystilbene
2,5-di(p-exthoxybenzylidene)cyclopenthanone
2,7-di-(benzylideneamino)fluorene
2,p-methoxybenzylideneamino phenanthrene
4-methoxy-4''-nitro-p-terphenyl
p-Azoxyanisole
4-p-methoxybenzylideneaminobiphenyl
4,4'-di-(benzylideneamino)biphenyl
p-n-Hexylbenzoic acid
p-n-Propoxybenzoic acid trans-p-methoxycinnamic acid
6-methoxy-2-naphthoic acid It will be understood that the screens 18 or 40 are maintained in the temperature range in which the compound exhibits the nematic mesophase, i.e., the temperature range above the melting point of the solid compound but below the temperature at which the molten compound becomes isotropic. It will also be understood that throughout this specification and in the claims, when reference is made to an organic nematic thermotropic compound, the compound is in that particular temperature range in which the nematic mesophase is exhibited. The threshold value for the voltage gradient impressed across or electrical field applied to the particular organic nematic thermotropic compound varies with the compound itself and with the particular distance between the two electrodes. However, for most of the organic nematic thermotropic compounds, the applied voltage is of the order of magnitude of about 1,000 volts per centimeter.

It will be apparent that various modifications and alterations can be made to the foregoing invention without departing from the concept thereof. The invention is to be limited only by the definition contained in the appended claims wherein:

What is claimed is:

1. A method for producing a speckle-free image from a coherent source on a screen, said screen comprising first and second electrodes and a liquid crystal having dynamic light scattering properties when subjected to a voltage gradient disposed therebetween, said first electrode being optically transmissive and said second electrode being optically reflecting, the method comprising the steps of:
   a. directing a coherent modulated and deflected light beam onto said screen, said screen being positioned such that said light beam first passes through said transparent electrode, passes through said liquid crystal and impinges on said second electrode;
   b. impressing a voltage on said electrodes to produce a voltage gradient across said liquid crystal, said voltage gradient being of sufficient magnitude to cause said liquid crystal to dynamically scatter said coherent modulated and deflected light beam thereby producing a speckle-free image on said screen.

2. A method for producing a speckle-free image on a screen in accordance with claim 1, wherein said liquid crystal is an organic nematic mesomorphic compound.

3. A method for producing a speckle-free display on a screen in accordance with claim 1 wherein said voltage is a DC voltage.

4. A method for producing a speckle-free display on a screen in accordance with claim 1 wherein said voltage is an alternating voltage.

5. A method for producing a speckle-free image from a coherent source on a screen, said screen comprising first and second optically transmissive electrodes and a liquid crystal having dynamic light scattering properties when subjected to a voltage gradient disposed therebetween, said method comprising the steps of:
   a. directing a coherent modulated and deflected light beam onto said screen, said screen being positioned such that said light beam passes through said first electrode, passes through said liquid crystal and through said second electrode;
   b. impressing a voltage on said electrodes to produce a voltage gradient across said liquid crystal, said voltage gradient being of sufficient magnitude to cause said liquid crystal to dynamically scatter said coherent modulated and deflected light beam thereby producing a speckle-free image on said screen.

6. A method for producing a speckle-free image on a screen in accordance with claim 5, wherein said liquid crystal is an organic nematic mesomorphic compound.

7. A method for producing a speckle-free display on a screen in accordance with claim 5 wherein said voltage is a DC voltage.

8. A method for producing a speckle-free display on a screen in accordance with claim 5 wherein said voltage is an alternating voltage.

* * * * *